United States Patent Office 3,208,786
Patented Sept. 28, 1965

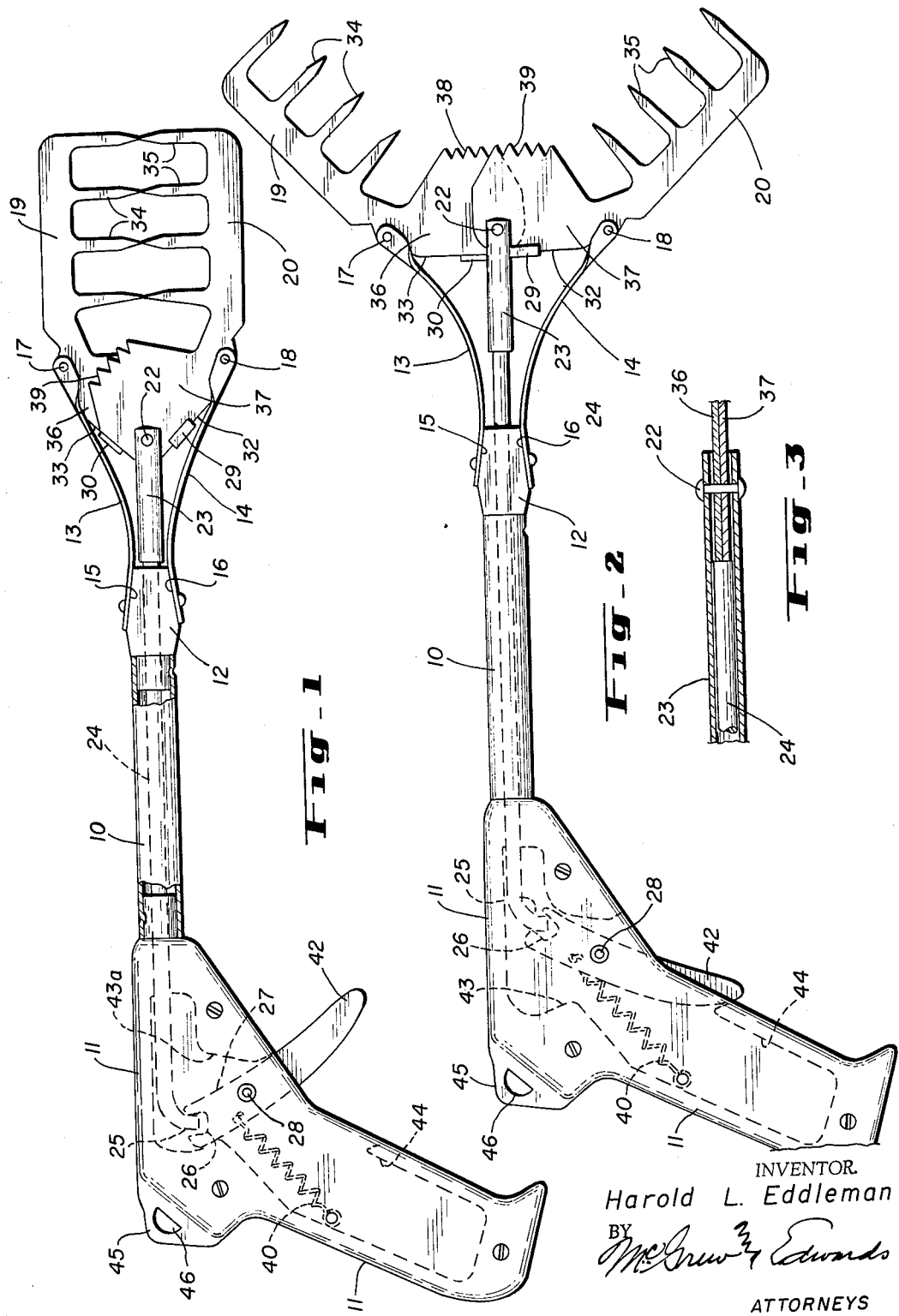

3,208,786
FISH GRAPPLE
Harold L. Eddleman, 4795 Indiana, Golden, Colo.
Filed Dec. 24, 1963, Ser. No. 333,039
4 Claims. (Cl. 294—19)

My invention relates to fish gaffs or grapples and particularly to an improved fish grapple of the type having snap-acting jaws released by a trigger.

Many forms of fish gaffs or grapples of the spring actuated jaw type have been devised for securing and landing fish caught by hook and line. Many of these devices include jaws which when open expose a trigger mechanism which may be tripped by contact with a fish between the jaws whereupon the jaws snap shut to trap and hold the fish. So-called "overcenter" toggle trigger mechanisms are frequently employed in these fish gripping devices, the mechanism being set upon opening of the jaws of the grapple. While these devices have met with some success, many have been complicated, difficult to set or prepare for use, or otherwise difficult to use. Accordingly, it is an object of my invention to provide a fish grapple including an improved mechanism for facilitating the one-handed use of the device.

It is another object of my invention to provide an improved fish grapple of the contact actuated type which enables the fisherman to set the grapple quickly for use at the time it is needed.

It is a further object of my invention to provide an improved fish grapple of the spring actuated jaw type which is of simple construction, easy to use and effective in operation.

Briefly, in carrying out the object of my invention in one embodiment thereof, I provide a grapple comprising an elongated handle or shaft provided with a pistol type grip and having a pair of jaws pivoted together at its opposite end and biased to their closed position by a pair of spaced spring arms secured to the handle and engaging the respective jaws intermediate their ends. The jaws are set by opening them until their common pivot passes outwardly to a point slightly over the common center line of the points where the arms engage the jaws. I provide stops on the jaws to limit their movement between the closed and open position. In order to set the jaws easily and by one hand I provide a rod in the handle for moving the common pivot outwardly between the jaws and arrange a spring biased lever as a trigger-like projection adjacent the pistol grip. The lever when pressed toward the grip sets the jaws and is released to return to its retracted position. The operation of setting the jaws and using the grapple to secure a fish may be accomplished easily by one hand, leaving the fisherman's other hand free to manipulate his rod and tackle.

The features of novelty which characterize my invention are pointed out with particularity in the claims annexed to and forming a part of this specification. My invention itself, however, both as to its organization and method of operation together with further objects and advantages thereof may be better understood upon reference to the following description taken in connection with the accompanying drawing, in which:

FIG. 1 is a longitudinal elevation view of a fish grapple embodying my invention;

FIG. 2 is a view of the grapple of FIG. 1 in its open or set position; and

FIG. 3 is an enlarged longitudinal view in section of a structural detail of the grapple of FIG. 1.

Referring now to the drawing, the fish grapple illustrated in FIG. 1 comprises an elongated hollow metal shaft or tube 10 mounted in a handle 11 of the piston grip type which is preferably molded from a plastic material. A metal fitting 12 is provided at the other end of the shaft 10 and a pair of spring arms 13 and 14 are rigidly attached to the sloping surfaces 15 and 16, respectively, of the fitting 12. The spring arms 13 and 14 are sprung outwardly and pivoted at 17 and 18 to jaws 19 and 20, respectively. The jaws 19 and 20 are made of sheet steel and are pivoted together at 22, and a bifurcated or slotted tubular fitting 23 is also secured to the pivot 22. The jaws are pressed inwardly by the arms 13 and 14 which are biased toward the central longitudinal axis of the device.

The fitting 23 is arranged to receive the right end of a rod 24 which is mounted for longitudinal movement in the tube 10 and is provided with a downwardly turned end or offset 25 which engages a recess 26 in the upper end of a lever 27 pivoted within the handle 11 at 28. The right-hand end of the rod 24 is slidable within the tube 23 and thus provides a lost motion connection between the rod and the jaw pivot 22. The extreme positions of the jaws are determined by stops 29 and 30 formed on the jaws 20 and 19, respectively. The stops are tabs bent over so that in the position illustrated in FIG. 1 the tab 29 engages a back surface 33 of the jaw 19 and the tab 30 engages a similar surface 32 on the jaw 20.

The jaws 19 and 20 are each provided with four sharp teeth 34 and 35, respectively, which meet as indicated in the closed position of the jaws. The jaws 19 and 20 have complementary enlarged end portions 36 and 37, the configuration of the portion 37 being clearly shown in the drawing. The portion 37 comprises an enlarged section extending along an axis at about 45° to the main portion of the jaw 20 and the portions 36 and 37, as stated before, are pivoted together by the common pivot 22.

When the rod 24 is urged forwardly it presses the pivot 22 to the right and forces the arms 13 and 14 apart at the pivots 17 and 18 until the pivot 22 has moved slightly past the common center line between the pivots 17 and 18 to the position shown in FIG. 2. The rod 24 may then be withdrawn, leaving the jaws locked in their set position by overcenter or toggle action; FIG. 2 shows the rod in its forward position before its release and return to its retracted position. The stops 29 and 30 engage opposite sides of the tube 23 in this position and limit the outer movement of the jaws.

The portions 36 and 37 are provided with toothed edges 38 and 39, respectively, which lie in substantially a straight line between the jaws in their open position as shown in FIG. 2. After the jaws have been set in this manner they may be tripped by placing them over an object such as a fish and tapping the toothed portions 38 and 39 which act as a trigger pushing the pivot 22 back over the center line between the pivots 17 and 18 and allowing the spring arms 13 and 14 to snap the jaws shut on the fish.

The lever 27 which engages the end 25 of the rod 24 is biased to its rearward position as shown in FIG. 1 by a spring 40, and a portion of the lever indicated at 42 extends outwardly from the grip 11 in a position similar to that of the trigger of a pistol. The lever portion 42 provides an easily operated arrangement for cocking the jaws of the grapple, which cocking action is secured by pressing the lever 42 toward the grip 11 thereby urging the rod 24 forwardly to cock the jaws in the manner described above. As soon as the lever 42 is released the spring 40 returns it to its retracted position. The retracted and extreme forward positions of the lever 42 are limited by stops 43 and 43a, respectively, which are molded in the material of the handle.

The construction of the tubular guide 23 is shown in greater detail in FIG. 3 which is a longitudinal sectional view of the tube assembly. In its forward position as illustrated in FIG. 3 the rod 24 engages the rear edges of the portions 36 and 37 of the jaws 19 and 20, respectively, which act as a stop for the rod 24 so that as the rod is pressed further forward it effects the cocking action of the jaws. When the rod is released it moves backwardly in the tube 23 to a retracted position within the tube so that it is out of the path of the portions 36 and 37 of the jaws when the jaws are snapped closed and is ready for opening the jaws again when required.

The handle 11 may be constructed of any suitable material and may, for example, be of a tough molded plastic provided with a central hollow or opening 44 within which the end 25 of the rod 24 and the lever 27 and spring 40 are free to operate. The handle is provided with a loop 45 forming a hole 46 suitable for attaching a lanyard which may be used to prevent loss of the gaff when not in use.

I have found that my arrangement of the grapple with a pistol grip and the operating lever 42 simulating the trigger of a pistol greatly facilitates the use of the device in securing a fish, for example, after it has been played up to the boat on rod and line. The arrangement of the grapple so that the fisherman may set it and use it with one hand while manipulating his rod with the other makes the grapple quick and reliable in use and further provides greater safety because the jaws, which are easily set by one hand, need not be set and prepared for use until the fisherman is ready to secure the fish and then are simply set by the trigger-like action of the forefinger, whereupon the trigger is released and the gaff pressed against the back of the fish to actuate the jaws. The fisherman need not handle the jaws when setting them in their open position.

While I have illustrated my invention in connection with a specific configuration of grapple, various modifications or alterations will occur to those skilled in the art. Therefore, I do not desire my invention to be limited to the details illustrated and described and I intend by the appended claims to cover all modifications which fall within the spirit and scope of my invention.

I claim:

1. A fish gaff comprising an elongated handle, a pair of spaced spring arms secured to said handle and extending from one end thereof, a pair of complementary jaws pivoted to one another at one end and each engaging a respective one of said arms intermediate the ends of the jaw and holding said arms apart and under stress, said jaws being movable between two extreme positions, the first with said jaws closed and the second with the pivot between said jaws over center with respect to the common center line of the points of engagement of said arms and jaws, stop means for limiting the movement of said jaws to within said extreme positions, a rod extending longitudinally of said handle and slidable therealong, means providing a lost motion connection between said rod and said pivot between said jaws, means for biasing said rod to a retracted position away from said pivot, and means affording movement of said rod forward toward said jaws to force said pivot forward to open said jaws and lock them in their open position whereupon said rod may be released to return to its retracted position.

2. A fishing gaff of the type comprising a handle and a pair of spaced spring arms secured to and extending from the handle and a pair of jaws pivoted together at one end and each pivoted to a respective one of said arms intermediate its ends, the jaws being movable against the spring pressure of the arms from a closed position to an open position wherein the common pivot of the jaws passes outwardly slightly over the common center line of the pivots on the arms whereby the jaws are tripped and snapped closed upon engagement with an object and movement of said common pivot back over center, said gaff including an operating rod mounted on said handle and movable toward and away from said common pivot for moving said common pivot from its position with the jaws closed outwardly to open said jaws and move the common pivot over center to lock said jaws in their open position, means for guiding said rod in its movement toward and away from said pivot, spring means for biasing said rod to its retracted position to hold it out of the path of said pivot upon operation of said jaws when tripped, and an operating element mounted on said handle for engagement with and operation of said rod.

3. A fishing gaff as set forth in claim 2 including a pistol grip on said handle and wherein said operating element comprises a lever pivoted on said grip and mounted with a trigger portion extending outwardly from said grip adjacent said grip and a second portion on the opposite side of the lever pivot engaging said rod for moving said rod forward when said trigger portion is pressed toward said pistol grip, said rod being returned to its retracted position by said biasing means upon release of said trigger portion.

4. A fishing gaff of the type comprising a handle and a pair of spaced spring arms secured to and extending from the handle and a pair of jaws pivoted together at one end and each pivoted to a respective one of said arms intermediate its ends, the jaws being movable against the spring pressure of the arms from a closed position to an open position wherein the common pivot of the jaws passes outwardly slightly over the common center line of the pivots on the arms whereby the jaws are tripped and snapped closed upon engagement with an object and movement of said common pivot back over center, said gaff including an operating rod mounted on said handle and movable toward and away from said common pivot, stops on said jaws for limiting their opening and closing movements, said gaff including a rod mounted for longitudinal movement on said handle toward and away from said common pivot for moving said common pivot from its position wtih the jaws closed outwardly to open said jaws and move the common pivot over center to lock said jaws in their open position, a lost motion connection between said rod and said common pivot for affording movement of said rod away from said pivot after opening of said jaws, spring means for biasing said rod to its retracted position, said lost motion connection comprising a tube connected to said pivot and slidably fitting about the end portion of said rod for a distance greater than the stroke of said rod required for opening said jaws.

References Cited by the Examiner

UNITED STATES PATENTS 144,110 10/73 Knapp.
1,568,984 1/26 McCollum.

SAMUEL F. COLEMAN, *Primary Examiner*.